US007012909B2

(12) United States Patent
Tanno et al.

(10) Patent No.: US 7,012,909 B2
(45) Date of Patent: Mar. 14, 2006

(54) CELL SEARCH METHOD AND APPARATUS FOR MOBILE STATION IN MOBILE COMMUNICATION SYSTEM

(75) Inventors: Motohiro Tanno, Kanagawa (JP); Takehiro Nakamura, Kanagawa (JP)

(73) Assignee: NTT DoCoMo, Inc., Tokyo ( * ) Notice: Subject to any disclaimer, the term of this patent is extended or adjusted under 35 U.S.C. 154(b) by 853 days.

(21) Appl. No.: 09/944,450

(22) Filed: Aug. 31, 2001

(65) Prior Publication Data

US 2002/0027898 A1  Mar. 7, 2002

(30) Foreign Application Priority Data

Sep. 4, 2000  (JP)  ............................. 2000-267209

(51) Int. Cl.
*H04B 7/216* (2006.01)
(52) U.S. Cl. ...................................... 370/335; 370/342
(58) Field of Classification Search .................... None
See application file for complete search history.

(56) References Cited

U.S. PATENT DOCUMENTS

| 6,067,460 | A | * | 5/2000 | Alanara et al. | ............. | 455/574 |
| 6,208,684 | B1 | * | 3/2001 | Yellin et al. | ................ | 375/144 |
| 2001/0040884 | A1 | * | 11/2001 | Bouquier et al. | ........... | 370/350 |
| 2002/0122557 | A1 | * | 9/2002 | Aihara et al. | ............... | 380/261 |

FOREIGN PATENT DOCUMENTS

| EP | 0825737 A1 | 2/1998 |
| EP | 0930723 A2 | 7/1999 |

OTHER PUBLICATIONS

3rd Generation Partnership Project; Techinical Specification Group Radio Access Network; Physical channels and mapping of transport channels onto physical channels (FDD) (Release 1999), 3GPP TS 25.211 V3.5.0 (Dec. 2000).

* cited by examiner

*Primary Examiner*—Huy D. Vu
*Assistant Examiner*—Cynthia L. Davis
(74) *Attorney, Agent, or Firm*—Workman Nydegger

(57) ABSTRACT

The present invention increases the detection accuracy of each of a first to a third steps of cell search to reduce the time required for detecting correct frame boundaries and scramble code. A mobile station inputs a received signal to a matched filter corresponding to a primary synchronization code PSC, and a multi-slot averaging section executes averaging over a plurality of slots in order to reduce the adverse effects of noise and interference. After the averaging over the plurality of slots, a multi-search averaging section further executes averaging over a plurality of searches. Subsequently, a peak detector selects a timing with which an average correlation value is largest, to detect slot boundaries.

104 Claims, 13 Drawing Sheets

CELL SEARCH METHOD AND APPARATUS FOR MOBILE STATION IN MOBILE COMMUNICATION SYSTEM

This application is based on Patent Application No. 2000-267209 filed Sep. 4, 2000, in Japan, the content of which is incorporated hereinto by reference.

BACKGROUND OF THE INVENTION

1. Field of the Invention

The present invention relates to a cell search method and apparatus for a mobile station in a mobile communication system.

2. Description of the Related Art

In a mobile communication system based on the CDMA (Code Division Multiple Access) method, if a mobile station communicates with a base station or measures power received from a base station, it must detect frame boundaries and a scramble code in a down signal from the base station. This is called "cell search".

The cell search method essentially comprises descrambling the signal at all possible scramble codes with all possible timings and selecting a timing and a scramble code with which a correlation coefficient obtained as a result of despreading with spreading codes used is largest, thereby detecting frame boundaries and the scramble code for the base station. This method, however, requires a large amount of time for the cell search. To increase the speed of the cell search, a method is used in which the base station transmits each slot through a PSCH (Primary Synchronization CHannel) and a SSCH (Secondary Synchronization CHannel) (refer to 3GPP Technical Specification 25.211).

FIG. 1 shows a configuration of a down channel relating to the cell search. This down channel relates to the cell search in the W-CDMA method (refer to 3GPP Technical Specification 25.211), which is representative of the CDMA method. On a primary synchronization channel, a spreading code PSC (Primary Synchronization Code) is used, which is common to all cells and slots, and the signals is transmitted in accordance with slot cycles. On a secondary synchronization channel, different spreading codes $SSC_0$ to $SSC_{n-1}$ (Secondary Synchronization Codes) are used for the respective slots, one frame constitutes a spreading code sequence, and is repeatedly and cyclically transmitted. Different spreading code sequences are used for respective cells. The primary and secondary synchronization channels are not subjected to scramble codes. On a common pilot channel (CPICH), the signals is transmitted by using a spreading code and a symbol pattern which are common to all the cells and subjecting the respective cells to different scramble codes.

FIG. 2 shows a first step operation performed in a conventional cell search method. On the primary synchronization channel, the spreading code PSC, which is common to all the cell and slots, is used. A mobile station inputs a received signal to a matched filter 201 corresponding to this spreading code PSC, and causes an multi-slot averaging section 202 to execute averaging over a plurality of slots in order to reduce the adverse effects of noise and interference. A peak detector 203 selects a timing with which an average correlation coefficient is largest, to detect slot boundaries. This operation is called a "first step".

On the secondary synchronization channel, the different spreading codes are used for the respective slots, and one frame constitutes a spreading code sequence. The spreading code sequence is repeated in accordance with frame cycles, and different spreading code sequences are used for the respective cells. These spreading code sequences are correlated with respective groups of scramble codes so as to allow the scramble codes to be subsequently detected easily. Since the slot boundaries have been detected at the first step, the mobile station can calculate a transmission timing on the secondary synchronization channel.

The mobile station then despreads a received signal using the calculated timing and the spreading codes SSC, averages correlation output coefficients corresponding to all possible frame boundaries and SSC sequences, and selects a timing and an SSC spreading code sequence with which the average correlation coefficient is largest. The mobile station thus detects the frame boundaries and a scramble code group. This operation is called a "second step".

FIG. 3 shows a second step operation performed in the conventional cell search method. A timing with which transmissions is executed on the secondary synchronization channel are calculated on the basis of the slot boundaries detected at the first step. A correlator 301 corresponding to the secondary synchronization codes detects a correlation using the calculated timing. This operation is performed over a plurality of slots, and the results are averaged by the multi-slot averaging section 302 so as to correspond to possible timings and SSC spreading code sequences. A peak detector 303 detects frame boundaries and a scramble code group by selecting a timing and an SSC spreading code sequence with which the average correlation coefficient is largest.

The mobile station, which has detected the frame boundaries and the scramble code group during the second step, finally receives the signal, which has been subjected to a scramble code, through the common pilot channel and determines which of the scramble codes of the scramble code group equals that of the signal. Since the frame boundaries have already been detected, the phase of the scramble code can be calculated. Since the spreading code for the common pilot channel is common to all the cells, essentially all the scramble codes within the group are used to descramble the signal, and the spreading code for the common primary channel is used to despread the signal. Then, these operations are performed over a plurality of symbols with the results averaged, and a scramble code is selected with which the average correlation coefficient is largest. This operation is called a "third step".

FIG. 4 shows a third step operation performed in the conventional cell search method. A correlator 401 calculates the phase of the scramble code on the basis of the frame boundaries detected at the second step, descrambles the signal using all the codes of the scramble code group detected at the second step, and despreads the signal using the spreading code for the common pilot signal. A peak detector 403 selects a scramble code with which the average correlation coefficient is largest, to detect a down scramble code used at the base station.

If the first to third steps are defined as one search, the mobile station determines whether or not the detected frame boundaries and scramble code are correct, after one search has been completed. If it has been determined that they are incorrect, memories for the respective steps are initialized, and the search is restarted. This operation is repeated until the correct frame boundaries and scramble code are detected.

Although a propagation path for mobile communication is subject to interference or noise, the signal noise interference power ratio (S/N) of the received signal of the mobile station on the primary synchronization channel, the secondary synchronization channel, or the common pilot channel is generally very small. On the other hand, the cell search is an operation required if the mobile station is to make various measurements for the signal received from the base station, if it is to communicate, or if it is to carry out handover. The search must be executed promptly and accurately in order to reduce the power consumption associated with the mobile communication and ensure a smooth communication. To increase the speed and accuracy of the cell search, the ratio of power transmitted through the down channel for the cell search to the total power transmitted from the base station may be measured. In this case, however, the system capacity disadvantageously decreases.

SUMMARY OF THE INVENTION

It is an object of the present invention to provide a cell search method for a mobile station in a mobile communication system which does not perform a correlation detecting operation for each step during each search using only an average correlation coefficient for the search but stores average correlation coefficients for past searches so that both the average correlation coefficient for the present search and the average correlation coefficients for the past searches are used to improve an averaging effect to increase the detection accuracy of each of the first to third steps, thereby improving the search duration and accuracy.

To attain this object, the present invention provides a method characterized by comprising a first step of despreading a received signal using a common spreading code common to all slots and detecting slot boundaries on the basis of a first average correlation coefficient, a second step of despreading the signal on the basis of the slot boundaries detected at the first step, using different individual spreading codes for the respective slots, and detecting frame boundaries and a scramble code group on the basis of a second average correlation coefficient, and a third step of descrambling a common pilot signal on the basis of the frame boundaries and scramble code group detected at the second step, and detecting a scramble code on the basis of a third average correlation coefficient, wherein after the first, second, and third steps have been repeated, the first step is executed to detect slot boundaries using a plurality of the first average correlation coefficients.

With this method, an average is calculated for a plurality of searches, so that noise and interference can be more effectively reduced to increase the detection accuracy of the first step.

The second step enables frame boundaries and a scramble code group to be detected using a plurality of second average correlation coefficients with which equal slot boundaries have been detected at the first step. With this method, average correlation coefficients calculated on the basis of the same slot boundaries are averaged to more effectively reduce noise and interference, thereby increasing the detection accuracy of the second step.

Further, the present invention provides a method characterized by comprising a first step of despreading a received signal using a common spreading code common to all slots and detecting slot boundaries on the basis of a first average correlation coefficient, a second step of despreading the signal on the basis of the slot boundaries detected at the first step, using different individual spreading codes for the respective slots, and detecting frame boundaries and a scramble code group on the basis of a second average correlation coefficient, and a third step of descrambling a common pilot signal on the basis of the frame boundaries and scramble code group detected at the second step, and detecting a scramble code on the basis of a third average correlation coefficient, wherein after the first, second, and third steps have been repeated, frame boundaries and a scramble code group are detected using a plurality of second average correlation coefficients with which equal slot boundaries have been detected at the first step.

With this method, only the average correlation coefficients calculated on the basis of the same slot boundaries are averaged to more effectively reduce noise and interference, thereby increasing the detection accuracy of the second step.

The third step enables a scramble code to be detected using a plurality of third average correlation coefficients with which equal frame boundaries and an equal scramble code group have been detected at the second step. With this method, average correlation coefficients calculated on the basis of the same frame boundaries and scramble code group are averaged to more effectively reduce noise and interference, thereby increasing the detection accuracy of the third step.

Furthermore, the present invention provides a method characterized by comprising a first step of despreading a received signal using a common spreading code common to all slots and detecting slot boundaries on the basis of a first average correlation coefficient, a second step of despreading the signal on the basis of the slot boundaries detected at the first step, using different individual spreading codes for the respective slots, and detecting frame boundaries and a scramble code group on the basis of a second average correlation coefficient, and a third step of descrambling a common pilot signal on the basis of the frame boundaries and scramble code group detected at the second step, and detecting a scramble code on the basis of a third average correlation coefficient, wherein after the first, second, and third steps have been repeated, a scramble code is detected using a plurality of third average correlation coefficients with which equal frame boundaries and an equal scramble code group have been detected at the second step.

With this method, only the average correlation coefficients calculated on the basis of the same frame boundaries and scramble code group are averaged to more effectively reduce noise and interference, thereby increasing the detection accuracy of the third step.

The first step enables a fourth average correlation coefficient to be calculated by averaging a plurality of first average correlation coefficients within a predetermined averaging section so that slot boundaries can be detected using a timing with which the fourth average correlation coefficient is largest. With this method, the average correlation coefficients are averaged within the predetermined averaging section to select a timing with which the average correlation coefficient is largest, thereby enabling slot boundaries to be detected more accurately.

Moreover, the plurality of first average correlation coefficients can be weighted. With this method, the weighting for the averaging can be achieved according to the temporal distance from the present time, thereby allowing the results of past searches to be used more flexibly.

Furthermore, the fourth average correlation coefficient can be calculated by the addition of a value obtained by multiplying the plurality of first average correlation coefficients by a forgetting factor. This method enables weighting using older average correlation coefficients even with a small size of memory.

The second step enables a fifth average correlation coefficient to be calculated by averaging, within a predetermined averaging section, a plurality of second average correlation coefficients with which equal slot boundaries have been detected at the first step so that frame boundaries and a scramble code group can be detected using a timing with which the fifth average correlation coefficient is largest. With this method, the average correlation coefficients are averaged within the predetermined averaging section to select a timing with which the average correlation coefficient is largest, thereby enabling frame boundaries and a scramble code group to be detected more accurately.

Moreover, the plurality of second average correlation coefficients can be weighted. With this method, the weighting for the averaging can be achieved according to the temporal distance from the present time, thereby allowing the results of past searches to be used more flexibly.

Furthermore, if the slot boundaries detected at the first step are equal, a value is added which is obtained by multiplying a sixth average correlation coefficient obtained by averaging a plurality of second average correlation coefficients within a predetermined averaging section, by a forgetting factor. If the slot boundaries detected at the first step are different, the result of the addition of the second average correlation coefficients can be defined as the fifth average correlation coefficient. This method enables weighting using older average correlation coefficients even with a small size of memory.

The third step enables a seventh average correlation coefficient to be calculated by averaging, within a predetermined averaging section, a plurality of third average correlation coefficients with which equal frame boundaries and an equal scramble code group have been detected at the second step so that the seventh average correlation coefficient can be used to detect scramble codes. With this method, the average correlation coefficients are averaged within the predetermined averaging section to select a timing with which the average correlation coefficient is largest, thereby enabling scramble codes to be detected more accurately.

Moreover, the plurality of third average correlation coefficients can be weighted. With this method, the weighting for the averaging can be achieved according to the temporal distance from the present time, thereby allowing the results of past searches to be used more flexibly.

Furthermore, if the frame boundaries and scramble code groups detected at the second step are respectively equal, a value can be added which is obtained by multiplying an eighth average correlation coefficient obtained by averaging a plurality of third average correlation coefficients within a predetermined averaging section, by a forgetting factor. If the frame boundaries and scramble code groups detected at the second step are respectively different, the result of the addition of the third average correlation coefficients can be defined as the seventh average correlation coefficient. This method enables weighting using older average correlation coefficients even with a small size of memory.

On the other hand, the predetermined averaging section can be adaptively changed according to the state of the mobile station. Since the optimal value of the number of averaging sectors depends on the state of the mobile station, this method adaptively changes this value according to the state to enable more efficient cell search.

Further, the value for the weighting can be adaptively changed according to the state of the mobile station. Since the optimal value for the weighting depends on the state of the mobile station, this method adaptively changes this value according to the state to enable more efficient cell search.

Furthermore, the value of the forgetting factor can be adaptively changed according to the state of the mobile station. Since the optimal value of the forgetting factor depends on the state of the mobile station, this method adaptively changes this value according to the state to enable more efficient cell search.

The state of the mobile station is either "immediately after power-on" or "standing by" or "communicating". Since the optimal values depend on the state of the mobile station, this method adaptively changes these values according to the state to enable more efficient cell search.

Further, the state of the mobile station is set in advance according to the movement speed of the mobile station. Since the optimal values depend on the state of the mobile station, this method adaptively changes these values according to the state to enable more efficient cell search.

According to the present invention, the averaging at each step of the cell search is executed using not only the result of the present search but also the results of past searches, thereby enabling more accurate search than that in the prior art.

Further, according to the present invention, the averaging section can be adaptively changed according to the speed of the mobile station or the state thereof including "immediately after power-on", "standing by", and "communicating", thereby achieving more efficient averaging.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
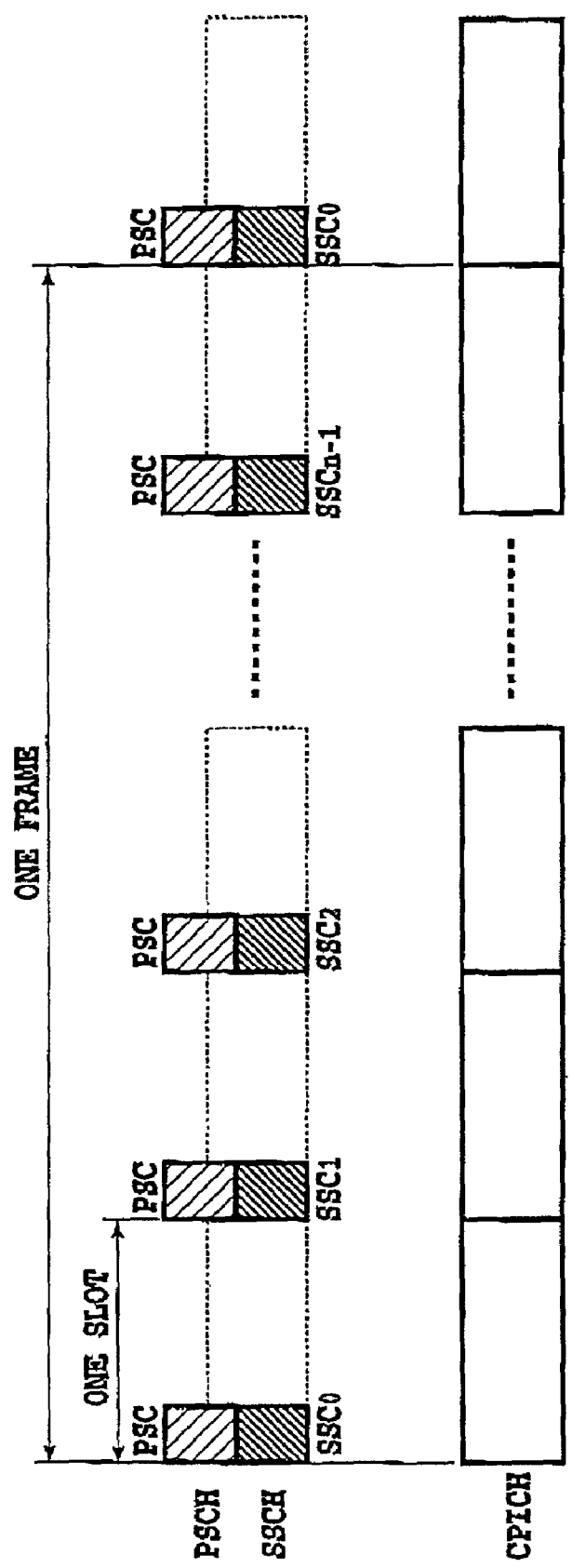
FIG. 1 is a schematic diagram showing a configuration of a down channel relating to cell search.
Figure 2:
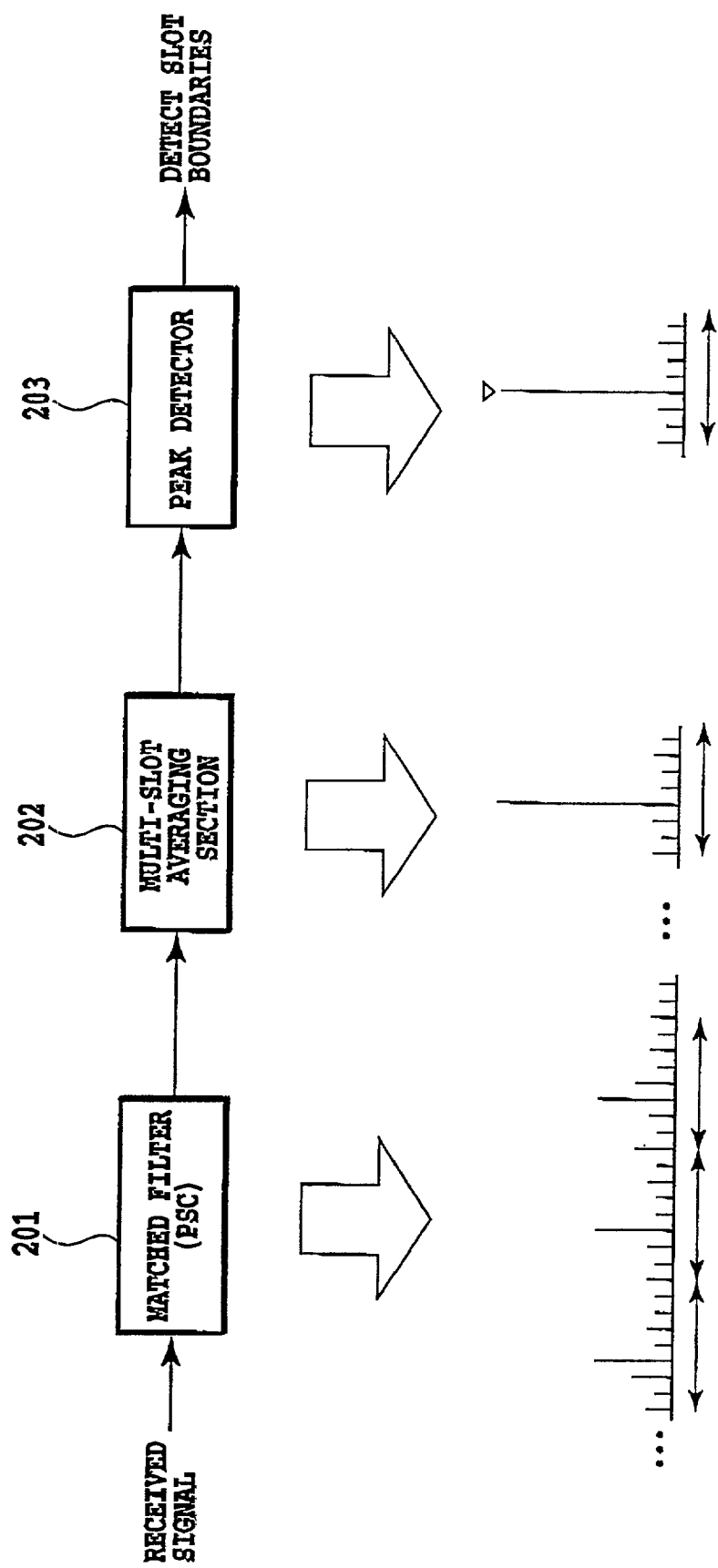
FIG. 2 is a diagram for use in describing an operation at a first step of a conventional cell search method.
Figure 3:
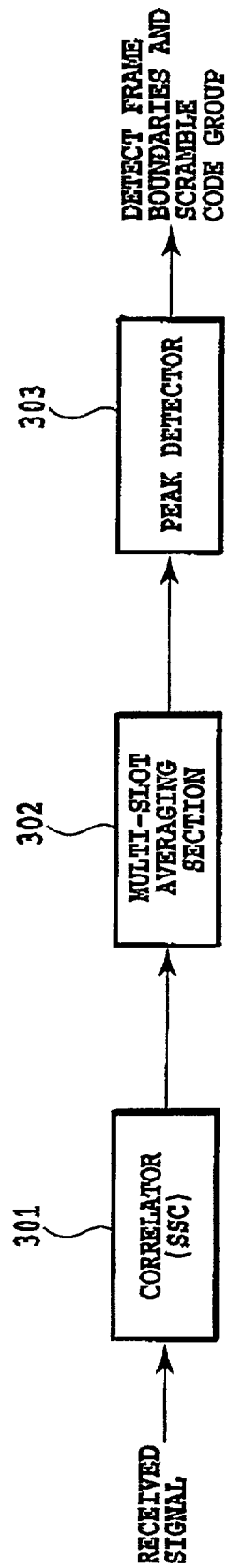
FIG. 3 is a diagram for use in describing an operation at a second step of the conventional cell search method.
Figure 4:
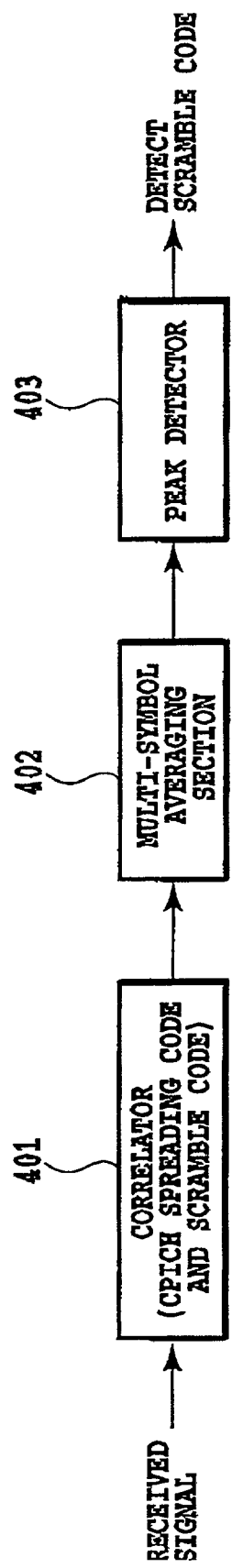
FIG. 4 is a diagram for use in describing an operation at a third step of the conventional cell search method.
Figure 5:
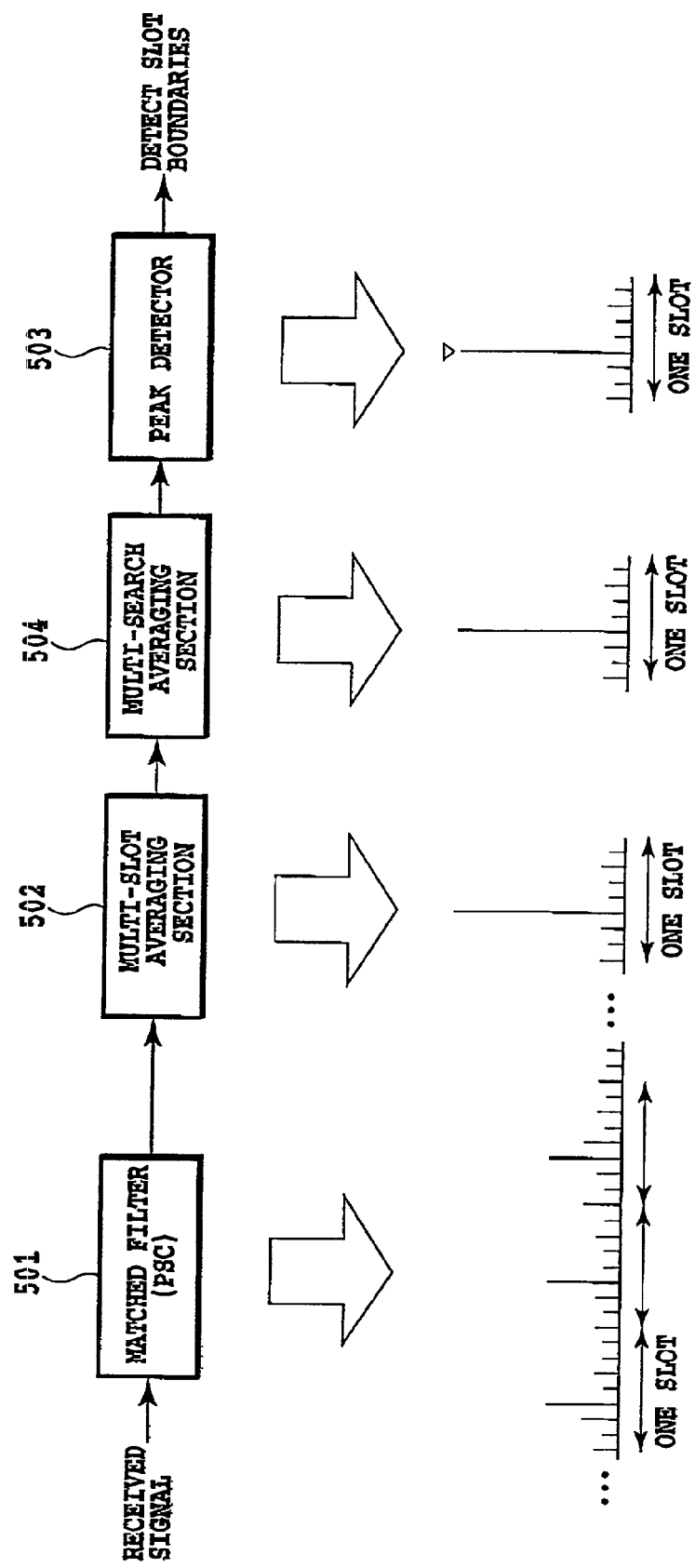
FIG. 5 is a diagram for use in describing an operation at a first step of a cell search method according to one embodiment of the present invention.

An embodiment of the present invention will be described below in detail with reference to the drawings. FIG. 5 shows an operation at a first step of a cell search method according to the embodiment of the present invention. On a primary synchronization channel, a spreading code PSC common to all cells and slots is used. A mobile station inputs a received signal to a matched filter 501 corresponding to this spreading code PSC, and a multi-slot averaging section 502 executes averaging over a plurality of slots in order to reduce noise or interference. In contrast to the conventional method, after the averaging over the plurality of slots, a multi-search averaging section 504 executes averaging over a plurality of searches. Subsequently, the peak detector 203 selects a timing with which the average correlation coefficient is largest, to detect slot boundaries. The averaging over the plurality of searches more effectively reduces noise and interference to increase the detection accuracy of the first step.

Figure 6:
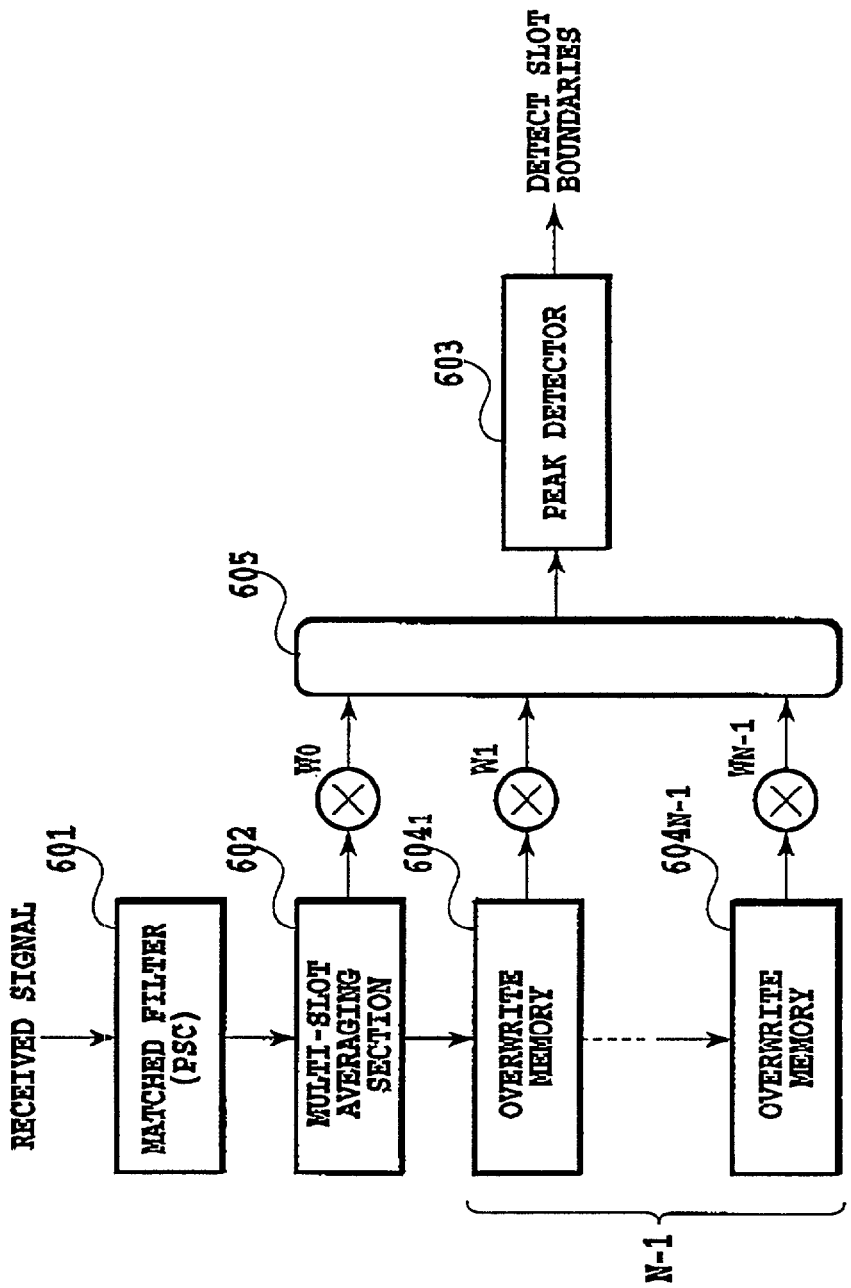
FIG. 6 is a diagram showing a multi-search averaging method executed at the first step of the cell search method according to the embodiment of the present invention.

FIG. 6 shows a method of multi-search averaging executed at the first step of the cell search method according to the embodiment of the present invention. The mobile station inputs a received signal to a matched filter 601 corresponding to the spreading code PSC, and a multi-slot averaging section 602 executes the averaging. The result of the averaging over the plurality of slots is stored in overwrite memories $604_1$ to $604_{N-1}$. In this manner, the results of past searches are stored, and a total of seven results including the one of the present search are averaged by an average value calculating section 605. A peak detector 603 then selects a timing with which the average correlation coefficient is largest, thereby enabling slot boundaries to be detected more accurately.

Since the slot boundary temporally varies due to the movement of the mobile station or the like, N may be properly set so that the multi-search averaging is executed only for a range within which the variation is small. Further, for the averaging, the results of the past searches can be more flexibly used by executing the weighting according to the temporal distance from the present time ($W_0$, $W_1$ to $W_{N-1}$).

Figure 7:
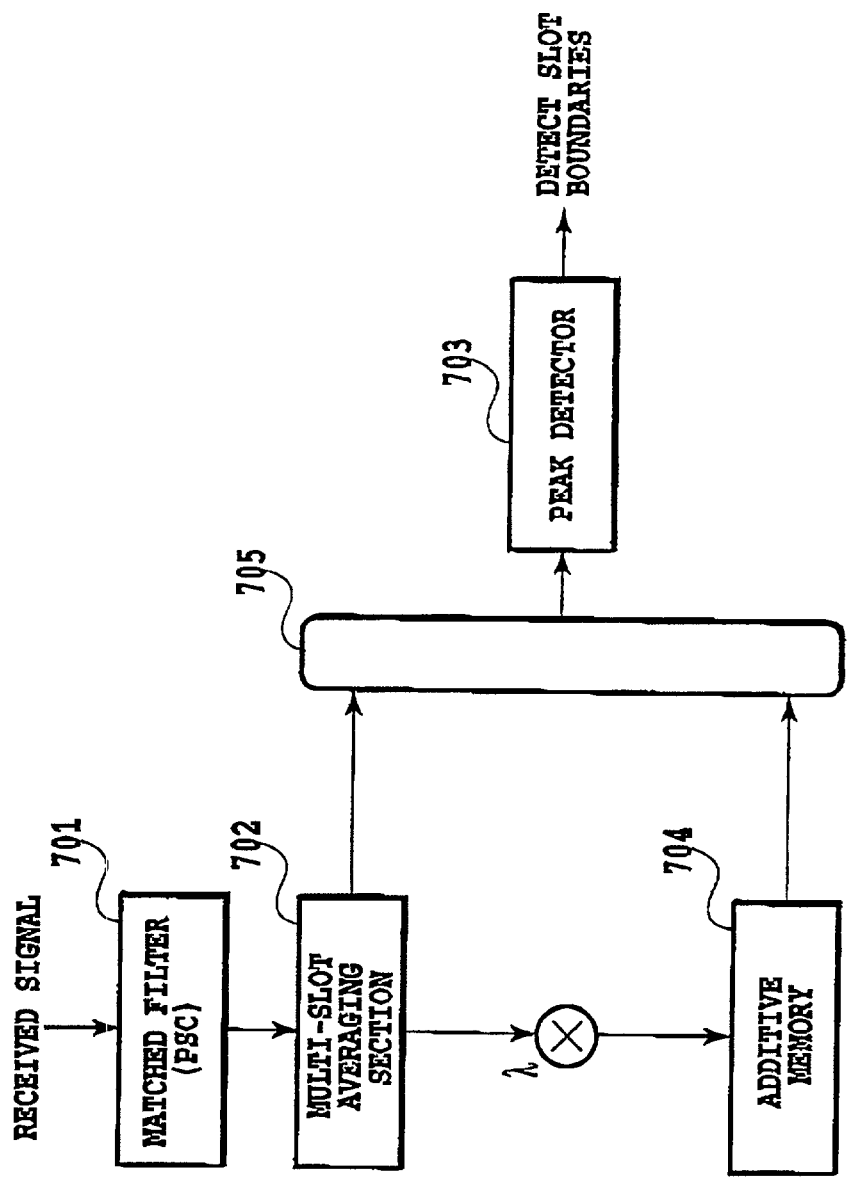
FIG. 7 is a diagram showing a method of executing the multi-search averaging at the first step using a forgetting factor.

FIG. 7 shows a method of executing the multi-search averaging at the first step using a forgetting factor. The mobile station inputs a received signal to a matched filter 701 corresponding to the spreading code PSC, and a multi-slot averaging section 702 executes the averaging. The result of the averaging over the plurality of slots is multiplied by a forgetting factor $\lambda (0 \leq \lambda \leq 1)$, and the result of the multiplication is added to an additive memory 704. The present result and the past results stored in the additive memory 704 are averaged by an average-value calculating section 705. A peak detector 703 selects a timing with which the average correlation coefficient is largest, to detect slot boundaries. For the multi-search averaging, the larger the forgetting factor $\lambda$ is, the older results can be used. This method advantageously requires only a small-sized memory.

Figure 8:
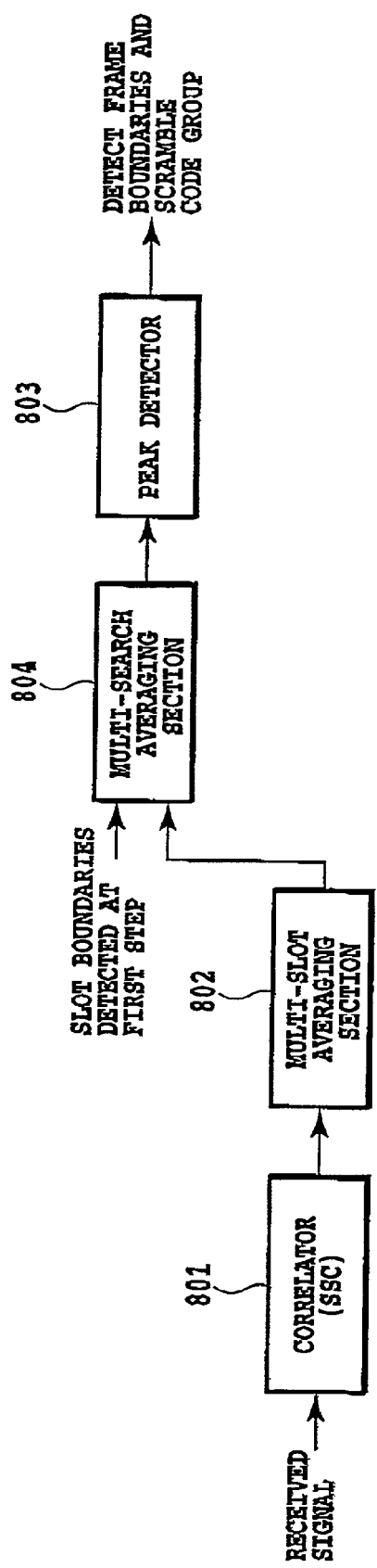
FIG. 8 is a diagram for use in describing an operation at a second step of a cell search method according to the embodiment of the present invention.

FIG. 8 shows an operation at a second step of the cell search method according to the embodiment of the present invention. A timing with which transmissions are executed on the secondary synchronization channel is calculated from the slot boundaries detected at the first step. A correlator 801 corresponding to secondary synchronization codes SSC detects a correlation using the calculated timing. This operation is performed over a plurality of slots, and the results are averaged by a multi-slot averaging section 802 so as to correspond to possible timings and SSC spreading code sequences. In contrast to the conventional method, not only the averaging is executed over the plurality of slots for the present search but a multi-search averaging section 804 also executes averaging over a plurality of searches. Further, the peak detector 803 selects a timing and an SSC sequence with which the average correlation coefficient is largest, to detect slot boundaries.

However, for the multi-search averaging are used only the slot boundaries detected at the first step of the present search and the average correlation coefficient obtained at the second step from searches in which the same slot boundaries have been detected. That is, average correlation coefficients calculated on the basis of different slot boundaries are not averaged. With this method, noise and interference can be more effectively reduced to increase the detection accuracy of the second step.

Figure 9:
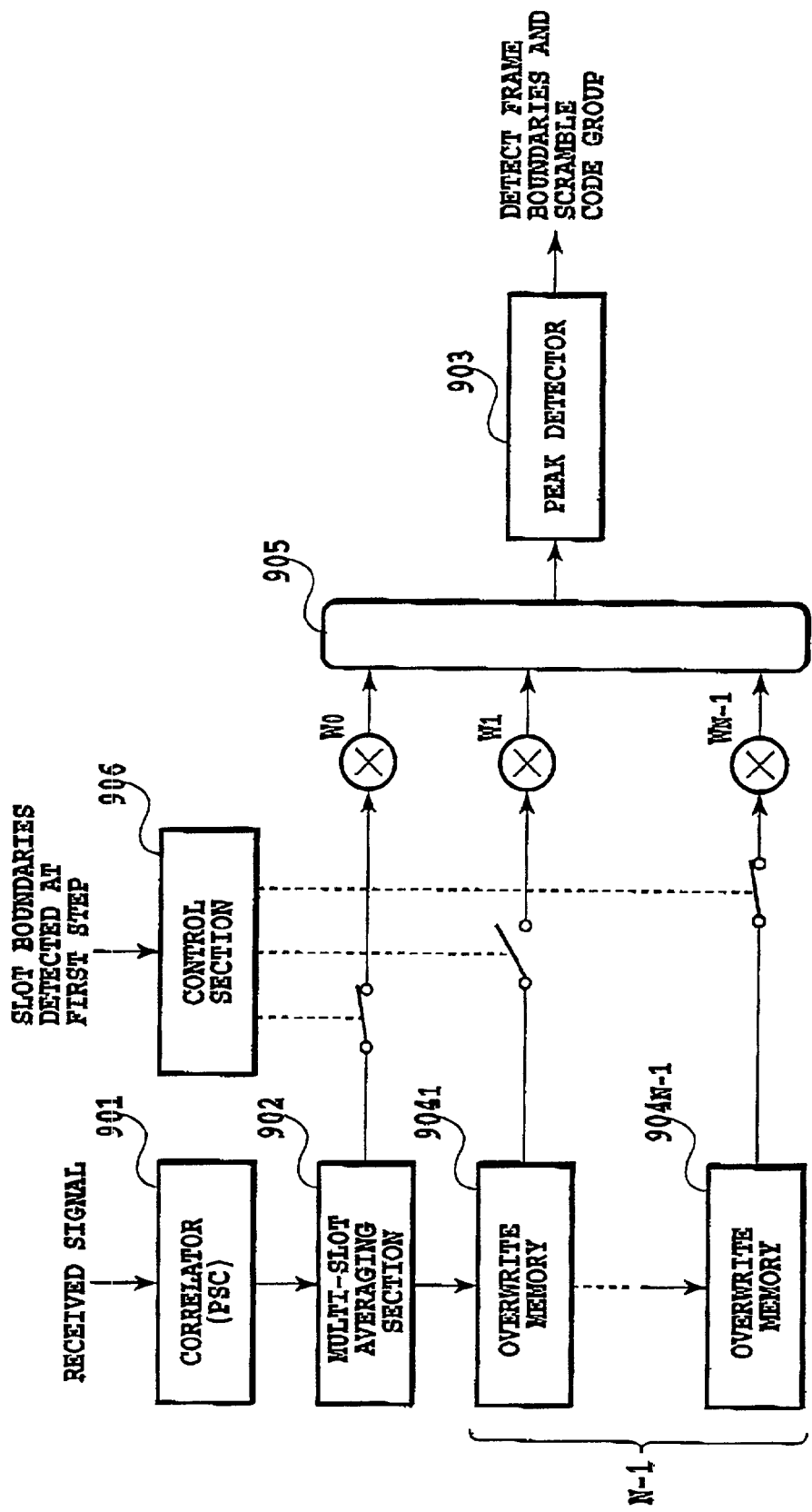
FIG. 9 is a diagram showing a multi-search averaging method executed at the second step of the cell search method according to the embodiment of the present invention.

FIG. 9 shows a method of executing the multi-search averaging at the second step of the cell search method according to the embodiment of the present invention. A timing with which transmissions are executed on the secondary synchronization channel is calculated from the slot boundaries detected at the first step. A correlator 901 corresponding to the secondary synchronization codes SSC detects a correlation using the calculated timing. This operation is performed over a plurality of slots, and the results are averaged by a multi-slot averaging section 902 so as to correspond to possible timings and SSC spreading code sequences. The result of the averaging over the plurality of slots is stored in overwrite memories $904_1$ to $904_{N-1}$. In this manner, the results of past searches are stored, and a maximum of N results including the one of the present search are averaged by an average-value calculating section 905. A peak detector 903 then selects a timing and an SSC sequence with which the average correlation coefficient is largest, thereby enabling frame boundaries and a scramble code group to be detected more accurately.

Since the frame boundary temporally varies due to the movement of the mobile station or the like, N may be properly set so that the multi-search averaging is executed only for a range within which the variation is small. Further, for the averaging, the results of the past searches can be more flexibly used by executing the weighting according to the temporal distance from the present time ($W_0$, $W_1$ to $W_{N-1}$).

Figure 10:
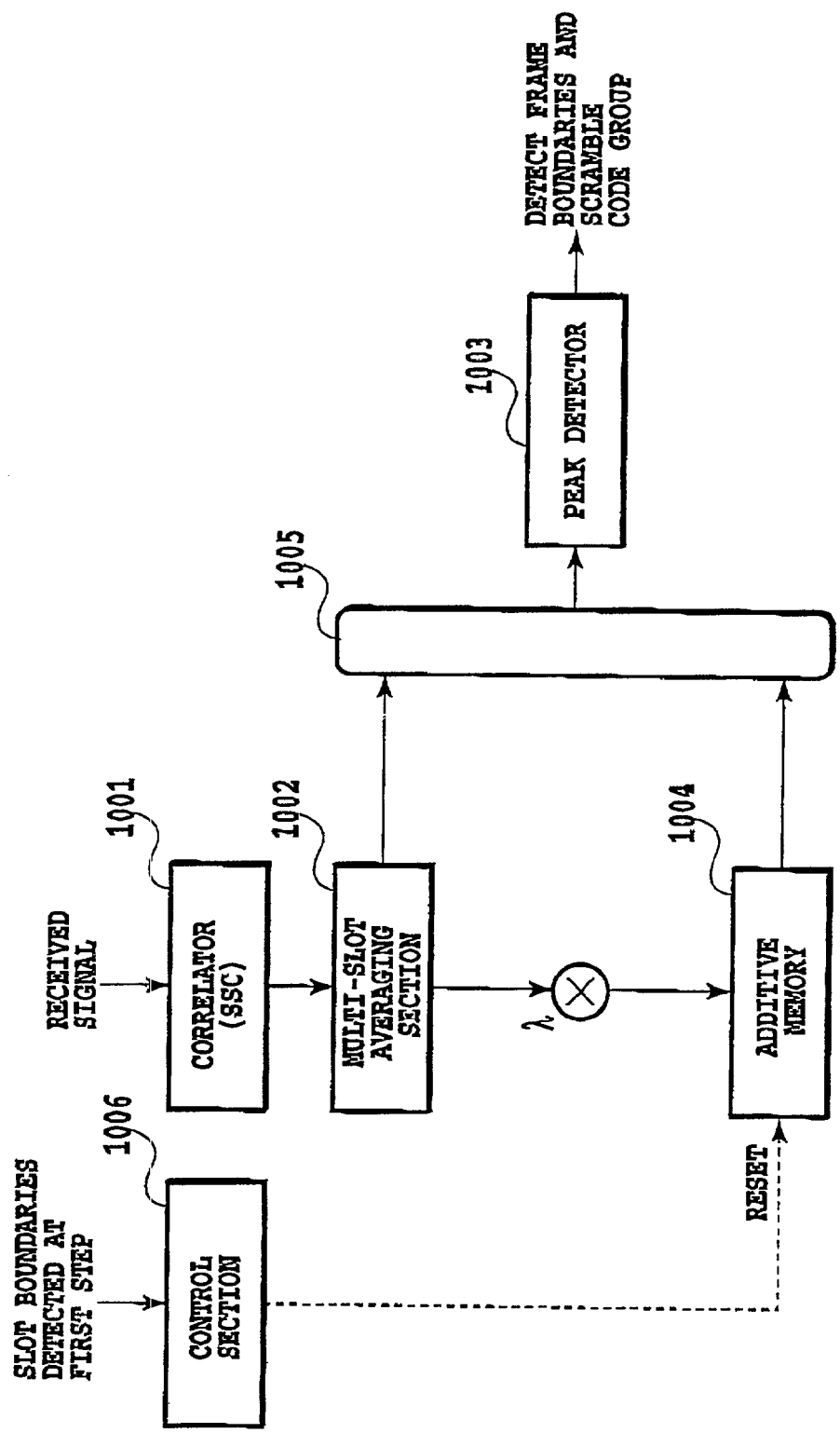
FIG. 10 is a diagram showing a method of executing the multi-search averaging at the second step using a forgetting factor.

However, for the multi-search averaging are used only the slot boundaries detected at the first step of the present search and the average correlation coefficient obtained at the second step from searches in which the same slot boundaries have been detected. In FIG. 9, a control section 906 monitors and stores the slot boundaries detected at the first step of each search and selects some of them for the averaging. Alternatively, similar effects are obtained by the control section 906 by controlling the weighting values ($W_0$, $W_1$ to $W_{N-1}$), FIG. 10 shows a method of executing the multi-search averaging at the second step using a forgetting factor. A timing with which transmissions is executed on the secondary synchronization channel are calculated from the slot boundaries detected at the first step. A correlator 1001 corresponding to the secondary synchronization codes SSC detects a correlation using the calculated timing. This operation is performed over a plurality of slots, and the results are averaged by a multi-slot averaging section 1002 so as to correspond to possible timings and SSC spreading code sequences. The result of the averaging over the plurality of slots is multiplied by a forgetting factor $\lambda (0 \leq \lambda \leq 1)$, and the result of the multiplication is added to an additive memory 1004. The present result and the past results stored in the additive memory 1004 are averaged by an average-value calculating section 1005. A peak detector 1003 selects a timing with which the average correlation coefficient is largest, to detect slot boundaries.

For the multi-search averaging, the larger the forgetting factor $\lambda$ is, the older results can be used. This method advantageously requires only a small-sized memory. Further, if the slot boundaries detected at the first step are different from the slot boundaries detected during the preceding search, then the control section 1006 resets the contents of the memory to avoid averaging average correlation coefficients for different timings which have been obtained at the second step.

Figure 11:
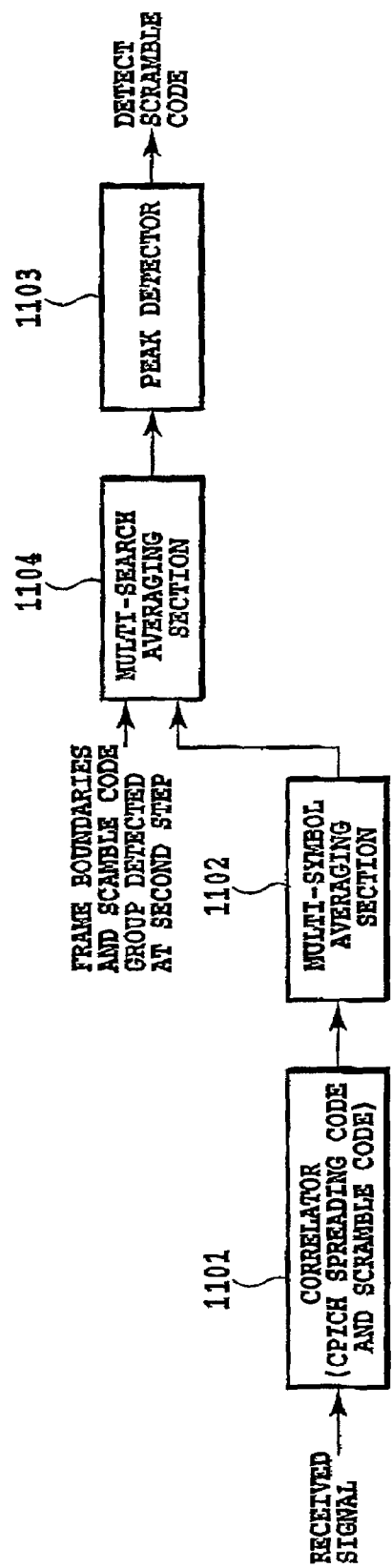
FIG. 11 is a diagram for use in describing an operation at a third step of a cell search method according to the embodiment of the present invention.

FIG. 11 shows an operation at a third step of the cell search method according to the embodiment of the present invention. A correlator 1101 calculates the phase of the scramble code on the basis of the frame boundaries detected at the second step, descrambles the signal using all the codes of the scramble code group detected at the second step, and despreads the signal using the spreading code for the common pilot channel. This operation is performed over a plurality of slots, and the results are averaged by a multi-symbol averaging section 1102. In contrast to the conventional method, not only the averaging is executed over the plurality of symbols for the present search but a multi-search averaging section 1104 also executes averaging over a plurality of searches. The peak detector 403 selects a scramble code with which the average correlation coefficient is largest, to detect a down scramble code used for the base station.

However, for the multi-search averaging are used only the average correlation coefficient obtained at the third step of searches in which the same frame boundaries and scramble code group as those in the present search have been detected at the second step. That is, average correlation coefficients calculated on the basis of different frame boundaries or scramble code groups are not averaged. With this method, noise and interference can be more effectively reduced to increase the detection accuracy of the third step.

Figure 12:
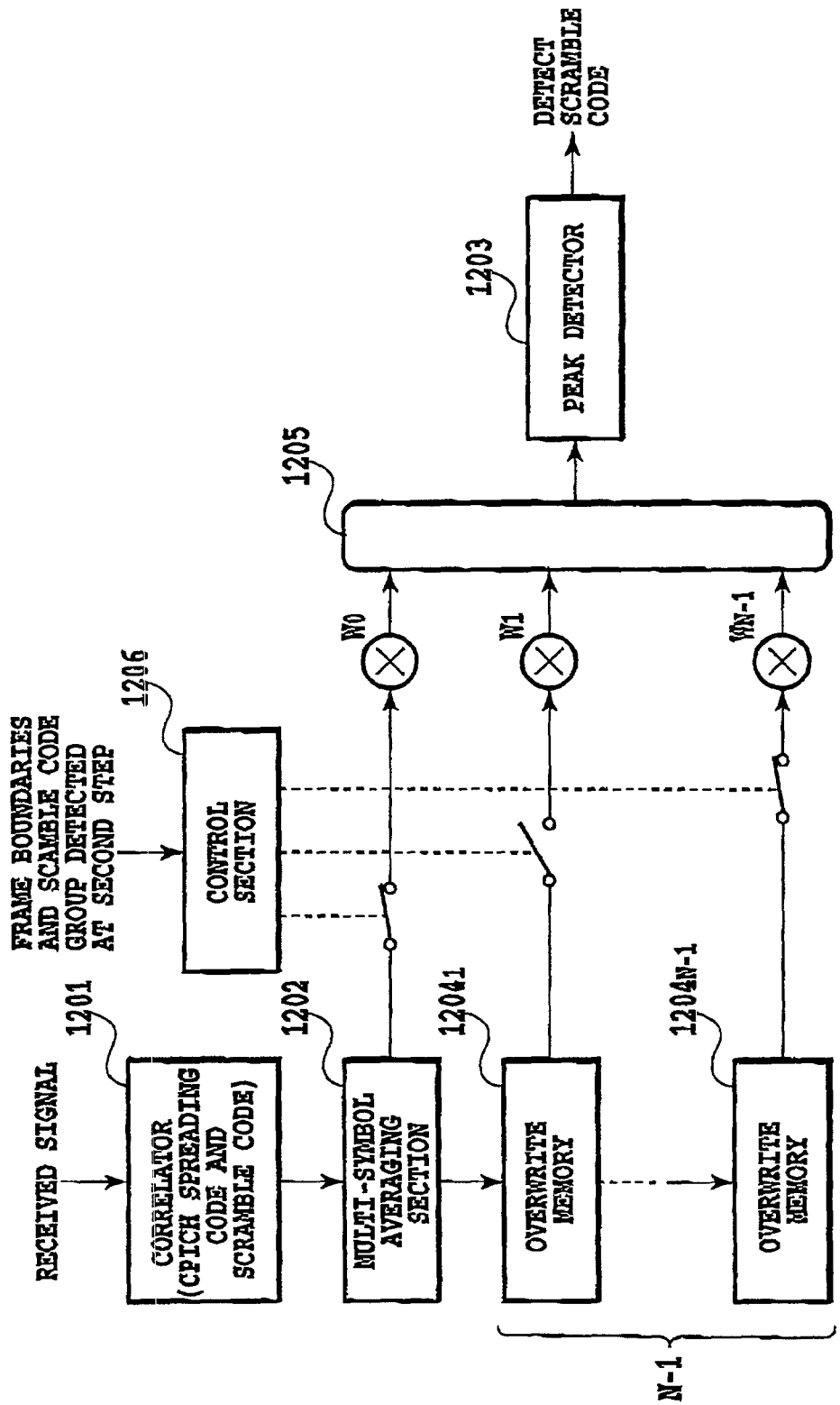
FIG. 12 is a diagram showing a multi-search averaging method executed at the third step of the cell search method according to the embodiment of the present invention.

FIG. 12 shows a method of executing the multi-search averaging at the third step of the cell search method according to the embodiment of the present invention. A correlator 1201 calculates the phase of the scramble code on the basis of the frame boundaries detected at the second step, descrambles the signal using all the codes of the scramble code group detected at the second step, and despreads the signal using the spreading code for the common pilot channel. This operation is performed over a plurality of symbols, and the results are averaged by a multi-symbol averaging section 1202. The result of the averaging over the plurality of symbols is stored in overwrite memories 1204$_1$ to 1204$_{N-1}$. In this manner, the results of past searches are stored, and a maximum of N results including the one of the present search are averaged by an average-value calculating section 1205. A peak detector 1203 then selects a scramble code with which the average correlation coefficient is largest, thereby detecting the scramble code more accurately.

Since the frame boundary temporally varies due to the movement of the mobile station or the like, N may be properly set so that the multi-search averaging is executed only for a range within which the variation is small. Further, for the averaging, the results of the past searches can be more flexibly used by executing the weighting according to the temporal distance from the present time ($W_0$, $W_1$ to $W_{N-1}$).

However, for the multi-search averaging are used only the average correlation values obtained at the third step of searches in which the same frame boundaries and scramble code group as those in the present search have been detected at the second step. In FIG. 12, a control section 1206 monitors and stores the frame boundaries and scramble detected at the second of each search and selects some of them for the averaging. Alternatively, similar effects are obtained by the control section 1206 by controlling the weighting values ($W_0$, $W_1$ to $W_{N-1}$).

Figure 13:
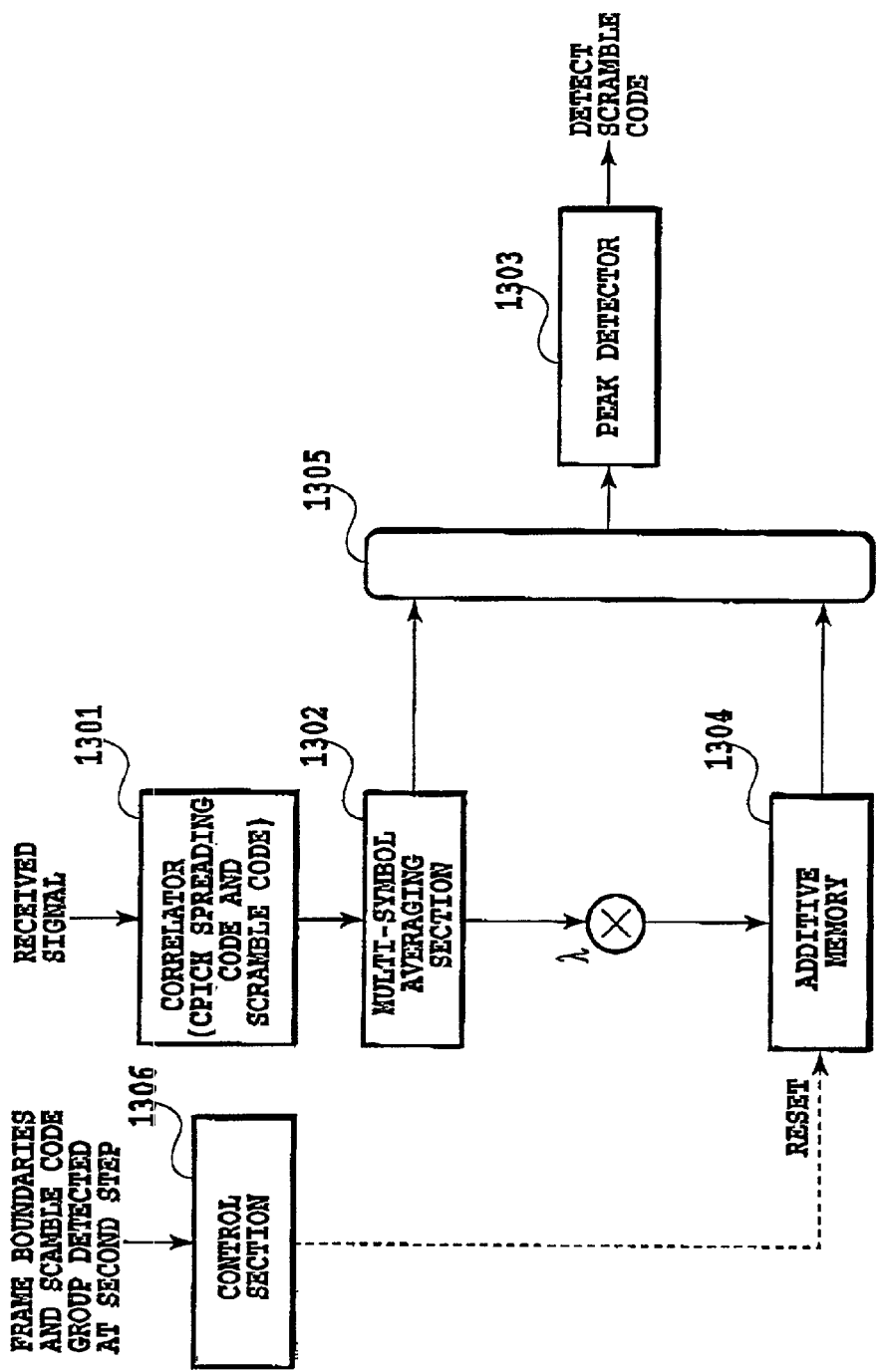
FIG. 13 is a diagram showing a method of executing the multi-search averaging at the third step using a forgetting factor.

FIG. 13 shows a method of executing the multi-search averaging at the third step using a forgetting factor. A correlator 1301 calculates the phase of the scramble code on the basis of the frame boundaries detected at the second step, descrambles the signal using all the codes of the scramble code group detected at the second step, and despreads the signal using the spreading code for the common pilot channel. This operation is performed over a plurality of symbols, and the results are averaged by a multi-symbol averaging section 1302. The result of the averaging over the plurality of symbols is multiplied by a forgetting factor $\lambda (0 \leq \lambda \leq 1)$, and the result of the multiplication is added to an additive memory 1304. The present result and the past results stored in the additive memory 1304 are averaged by an average-value calculating section 1305. A peak detector 1003 selects a timing with which the average correlation coefficient is largest, to detect slot boundaries.

For the multi-search averaging, the larger the forgetting factor $\lambda$ is, the older results can be used. This method advantageously requires only a small-sized memory. Further, if the frame boundaries and scramble code group detected at the second step are different from those detected during the preceding search, then the control section 1306 resets the contents of the memory to avoid averaging those average correlation coefficients for different timings or scramble code groups which have been obtained at the third step.

The optimal value of the number of memories used for the averaging, the weighting, or the forgetting factor depends on the movement speed of the mobile station or the like. Thus, the cell search can be more effectively executed by adaptively changing these values according to the movement speed or the like.

Further, when, for example, the power to the mobile station is turned on, a clock of the mobile station is unstable. Accordingly, the averaging section must be shortened. Also during a standby period, the clock is so unstable that a current consumption problem may occur, so that the averaging section must be shortened. In this manner, the cell search can be more effectively executed by changing the number N of memories used for the averaging, the weighting value ($W_0$, $W_1$ to $W_{N-1}$), or the forgetting factor value $\lambda$ ($0 \leq \lambda \leq 1$) according to the state of the mobile station.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A cell search method for a mobile station in a mobile communication system, the method being characterized by comprising:

a first step of despreading a received signal by the mobile station using a common spreading code common to all slots and detecting slot boundaries on the basis of a first average correlation coefficient;

a second step of despreading the signal on the basis of said slot boundaries detected at the first step, using different individual spreading codes for said respective slots, and detecting frame boundaries and a scramble code group on the basis of a second average correlation coefficient; and a third step of descrambling a common pilot signal on the basis of said frame boundaries and scramble code group detected at the second step, and detecting a scramble code on the basis of a third average correlation coefficient;

wherein after said first, second, and third steps have been repeated n times (n>2), said first step on n+1 th time is executed to detect slot boundaries using a plurality of said first average correlation coefficients obtained by n th times of said first step.

2. The cell search method for a mobile station in a mobile communication system according to claim 1, characterized in that said second step comprises detecting frame boundaries and a scramble code group using a plurality of said second average correlation coefficients, each of said second average correlation coefficients having indentical said slot boundaries detected at said first step.

3. The cell search method for a mobile station in a mobile communication system according to claim 1, characterized in that said third step comprises detecting a scramble code using a plurality of said third average correlation coefficients, each of said third average correlation coefficients having identical said frame boundaries and scramble code group detected at said second step.

4. The cell search method for a mobile station in a mobile communication system according to claim 1, characterized in that said first step comprises calculating a fourth average correlation coefficient by averaging a plurality of said first average correlation coefficients within a predetermined slots, and detecting said slot boundaries using a timing with which the fourth average correlation coefficient is largest.

5. The cell search method for a mobile station in a mobile communication system according to claim 2, characterized in that said third step comprises detecting a scramble code using a plurality of said third average correlation coefficients, each of said third average correlation coefficients having identical said frame boundaries and scramble code group detected at said second step.

6. The cell search method for a mobile station in a mobile communication system according to claim 2, characterized in that said first step comprises calculating a fourth average correlation coefficient by averaging a plurality of said first average correlation coefficients within a predetermined slots, and detecting said slot boundaries using a timing with which the fourth average correlation coefficient is largest.

7. The cell search method for a mobile station in a mobile communication system according to claim 2, characterized in that said second step comprises calculating a fifth average correlation coefficient by averaging, within a predetermined slots, a plurality of said second average correlation coefficients, each of said second average correlation coefficients having identical said slot boundaries detected at said first step, and detecting said frame boundaries and scramble code group using a timing with which the fifth average correlation coefficient is largest.

8. The cell search method for a mobile station in a mobile communication system according to claim 3, characterized in that said first step comprises calculating a fourth average correlation coefficient by averaging a plurality of said first average correlation coefficients within a predetermined slots and detecting said slot boundaries using a timing with which the fourth average correlation coefficient is largest.

9. The cell search method for a mobile station in a mobile communication system according to claim 3, characterized in that said third step comprises calculating a seventh average correlation coefficient by averaging, within a predetermined slots, a plurality of said third average correlation coefficients, each of said third average correlation coefficients having identical said frame boundaries and scramble code group detected at said second step, and detecting said scramble codes using the seventh average correlation coefficient.

10. The cell search method for a mobile station in a mobile communication system according to claim 5, characterized in that said first step comprises calculating a fourth average correlation coefficient by averaging a plurality of said first average correlation coefficients within a predetermined slots, and detecting said slot boundaries using a timing with which the fourth average correlation coefficient is largest.

11. The cell search method for a mobile station in a mobile communication system according to claim 5, characterized in that said second step comprises calculating a fifth average correlation coefficient by averaging, within a predetermined slots, a plurality of said second average correlation coefficients, each of said second average correlation coefficients having identical said slot boundaries detected at said first step, and detecting said frame boundaries and scramble code group using a timing with which the fifth average correlation coefficient is largest.

12. The cell search method for a mobile station in a mobile communication system according to claim 5, characterized in that said third step comprises calculating a seventh average correlation coefficient by averaging, within a predetermined slots, a plurality of said third average correlation coefficients, each of said third average correlation coefficients having identical said frame boundaries and scramble code group detected at said second step, and detecting said scramble codes using the seventh average correlation coefficient.

13. The cell search method for a mobile station in a mobile communication system according to claim 4, characterized in that a plurality of said first average correlation values are weighted.

14. The cell search method for a mobile station in a mobile communication system according to claim 4, characterized in that said fourth average correlation value is calculated by adding a value obtained by multiplying a plurality of said first average correlation values by a forgetting factor.

15. The cell search method for a mobile station in a mobile communication system according to claim 4, characterized in that said predetermined slots is adaptively changed according to a state of said mobile station.

16. The cell search method for a mobile station in a mobile communication system according to claim 13, characterized in that a value of said weighting is adaptively changed according to the state of said mobile station.

17. The cell search method for a mobile station in a mobile communication system according to claim 14, characterized in that a value of said forgetting factor is adaptively changed according to the state of said mobile station.

18. The cell search method for a mobile station in a mobile communication system according to claim 15, characterized in that the state of said mobile station is either a state immediately after power-on or a standby state or a communicating state.

19. The cell search method for a mobile station in a mobile communication system according to claim 15, characterized in that the state of said mobile station is set according to a movement speed of said mobile station in advance.

20. The cell search method for a mobile station in a mobile communication system according to claim 16, characterized in that the state of said mobile station is either a state immediately after power-on or a standby state or a communicating state.

21. The cell search method for a mobile station in a mobile communication system according to claim 16, characterized in that the state of said mobile station is set according to a movement speed of said mobile station in advance.

22. The cell search method for a mobile station in a mobile communication system according to claim 17, characterized in that the state of said mobile station is either a state immediately after power-on or a standby state or a communicating state.

23. The cell search method for a mobile station in a mobile communication system according to claim 17, characterized in that the state of said mobile station is set according to a movement speed of said mobile station in advance.

24. A cell search method for a mobile station in a mobile communication system, the method being characterized by comprising:
   a first step of despreading a received signal by the mobile station using a common spreading code common to all slots and detecting slot boundaries on the basis of a first average correlation coefficient;
   a second step of despreading the signal on the basis of said slot boundaries detected at the first step, using different individual spreading codes for said respective slots, and detecting frame boundaries and a scramble code group on the basis of a second average correlation coefficient; and
   a third step of descrambling a common pilot signal on the basis of said frame boundaries and scramble code group detected at the second step, and detecting a scramble code on the basis of a third average correlation coefficient;
   wherein after said first, second, and third steps have been repeated n times (n>2), said second step on n+1 th time is executed to detect a frame boundaries and a scramble code group using a plurality of said second average correlation coefficients, each of said second average correlation coefficients having identical said slot boundaries detected at said first step.

25. The cell search method for a mobile station in a mobile communication system according to claim 24, characterized in that said third step comprises detecting a scramble code using a plurality of said third average correlation coefficients, each of said third average correlation coefficients having identical said frame boundaries and scramble code group detected at said second step.

26. The cell search method for a mobile station in a mobile communication system according to claim 24, characterized in that said second step comprises calculating a fifth average correlation coefficient by averaging, within a predetermined slots, a plurality of said second average correlation coefficients, each of said second average correlation coefficients having identical said slot boundaries detected at said first step, and detecting said frame boundaries and scramble code group using a timing with which the fifth average correlation coefficient is largest.

27. The cell search method for a mobile station in a mobile communication system according to claim 25, characterized in that said second step comprises calculating a fifth average correlation coefficient by averaging, within a predetermined slots, a plurality of said second average correlation coefficients, each of said second average correlation coefficients having identical said slot boundaries detected at said first step, and detecting said frame boundaries and scramble code group using a timing with which the fifth average correlation coefficient is largest.

28. The cell search method for a mobile station in a mobile communication system according to claim 25, characterized in that said third step comprises calculating a seventh average correlation coefficient by averaging, within a predetermined slots, a plurality of said third average correlation coefficients, each of said third average correlation coefficients having identical said frame boundaries and scramble code group detected at said second step, and detecting said scramble codes using the seventh average correlation coefficient.

29. The cell search method for a mobile station in a mobile communication system according to claim 26, characterized in that a plurality of said second average correlation values are weighted.

30. The cell search method for a mobile station in a mobile communication system according to claim 26, characterized in that if said slot boundaries detected at said first step are equal, a value is added which is obtained by multiplying a sixth average correlation coefficient obtained by averaging a plurality of said second average correlation coefficients within a predetermined slots, by a forgetting factor, and if said slot boundaries detected at said first step are different, a result of the addition of said second average correlation coefficients is defined as said fifth average correlation coefficient.

31. The cell search method for a mobile station in a mobile communication system according to claim 26, characterized in that said predetermined slots is adaptively changed according to a state of said mobile station.

32. The cell search method for a mobile station in a mobile communication system according to claim 29, characterized in that a value of said weighting is adaptively changed according to the state of said mobile station.

33. The cell search method for a mobile station in a mobile communication system according to claim 30, characterized in that a value of said forgetting factor is adaptively changed according to the state of said mobile station.

34. The cell search method for a mobile station in a mobile communication system according to claim 31, characterized in that the state of said mobile station is either a state immediately after power-on or a standby state or a communicating state.

35. The cell search method for a mobile station in a mobile communication system according to claim 31, characterized in that the state of said mobile station is set according to a movement speed of said mobile station in advance.

36. The cell search method for a mobile station in a mobile communication system according to claim 32, characterized in that the state of said mobile station is either a state immediately after power-on or a standby state or a communicating state.

37. The cell search method for a mobile station in a mobile communication system according to claim 32, characterized in that the state of said mobile station is set according to a movement speed of said mobile station in advance.

38. The cell search method for a mobile station in a mobile communication system according to claim 33, characterized in that the state of said mobile station is either a state immediately after power-on or a standby state or a communicating state.

39. The cell search method for a mobile station in a mobile communication system according to claim 33, characterized in that the state of said mobile station is set according to a movement speed of said mobile station in advance.

40. A cell search method for a mobile station in a mobile communication system, the method being characterized by comprising:
a first step of despreading a received signal by the mobile station using a common spreading code common to all slots and detecting slot boundaries on the basis of a first average correlation coefficient;
a second step of despreading the signal on the basis of said slot boundaries detected at the first step, using different individual spreading codes for said respective slots, and detecting frame boundaries and a scramble code group on the basis of a second average correlation coefficient; and
a third step of descrambling a common pilot signal on the basis of said frame boundaries and scramble code group detected at the second step, and detecting a scramble code on the basis of third average correlation coefficient;
wherein after said first, second, and third steps have been repeated n times (n>2), said third step on n+1 th time is executed to detect a scramble code using a plurality of said third average correlation coefficients, each of said third average correlation coefficients having identical said frame boundaries and scramble code group detected at said second step.

41. The cell search method for a mobile station in a mobile communication system according to claim 40, characterized in that said third step comprises calculating a seventh average correlation coefficient by averaging, within a predetermined slots, a plurality of said third average correlation coefficients, each of said third average correlation coefficients having identical said frame boundaries and scramble code group detected at said second step, and detecting said scramble codes using the seventh average correlation coefficient.

42. The cell search method for a mobile station in a mobile communication system according to claim 41, characterized in that a plurality of said third average correlation values are weighted.

43. The cell search method for a mobile station in a mobile communication system according to claim 41, characterized in that if said frame boundaries and scramble code groups detected at said second step are respectively equal, a value can be added which is obtained by multiplying an eighth average correlation coefficient obtained by averaging a plurality of said third average correlation coefficients within a predetermined slots, by a forgetting factor, and if said frame boundaries and scramble code groups detected at said second step are respectively different, a result of the addition of said third average correlation coefficients is defined as said seventh average correlation coefficient.

44. The cell search method for a mobile station in a mobile communication system according to claim 41, characterized in that said predetermined slots is adaptively changed according to a state of said mobile station.

45. The cell search method for a mobile station in a mobile communication system according to claim 42, characterized in that a value of said weighting is adaptively changed according to the state of said mobile station.

46. The cell search method for a mobile station in a mobile communication system according to claim 43, characterized in that a value of said forgetting factor is adaptively changed according to the state of said mobile station.

47. The cell search method for a mobile station in a mobile communication system according to claim 44, characterized in that the state of said mobile station is either a state immediately after power-on or a standby state or a communicating state.

48. The cell search method for a mobile station in a mobile communication system according to claim 44, characterized in that the state of said mobile station is set according to a movement speed of said mobile station in advance.

49. The cell search method for a mobile station in a mobile communication system according to claim 45, characterized in that the state of said mobile station is either a state immediately after power-on or a standby state or a communicating state.

50. The cell search method for a mobile station in a mobile communication system according to claim 45, characterized in that the state of said mobile station is set according to a movement speed of said mobile station in advance.

51. The cell search method for a mobile station in mobile communication system according to claim 46, characterized in that the state of said mobile station is either a state immediately after power-on or a standby state or a communicating state.

52. The cell search method for a mobile station in a mobile communication system according to claim 46, characterized in that the state of said mobile station is set according to a movement speed of said mobile station in advance.

53. A cell search apparatus for a mobile station in a mobile communication system, the apparatus being characterized by comprising:
a first detector for despreading a received signal by the mobile station using a common spreading code common to all slots and detecting slot boundaries on the basis of a first average correlation coefficient;
a second detector for despreading the signal on the basis of said slot boundaries detected at the first detector, using different individual spreading codes for said respective slots, and detecting frame boundaries and a scramble code group on the basis of a second average correlation coefficient; and
a third detector for descrambling a common pilot signal on the basis of said frame boundaries and scramble code group detected by the second detector, and detecting a scramble code on the basis of a third average correlation coefficient;
wherein said first detector comprises means for storing a plurality of said first average correlation coefficients obtained during a plurality of searches, and means for detecting slot boundaries using a plurality of said first average correlation coefficients.

54. The cell search apparatus for a mobile station in a mobile communication system according to claim 53, characterized in that said second detector detects frame boundaries and a scramble code group using a plurality of said second average correlation coefficients, each of said second average correlation coefficients having identical said slot boundaries detected by said first detector.

55. The cell search apparatus for a mobile station in a mobile communication system according to claim 53, characterized in that said third detector detects a scramble code using a plurality of said third average correlation coefficients, each of said third average correlation coefficients having identical said frame boundaries and scramble code group detected by said second detector.

56. The cell search apparatus for a mobile station in a mobile communication system according to claim 53, characterized in that said first detector comprises means for calculating a fourth average correlation coefficient by averaging a plurality of said first average correlation coefficients within a predetermined slots, and means for detecting said slot boundaries using a timing with which the fourth average correlation coefficient is largest.

57. The cell search apparatus for a mobile station in a mobile communication system according to claim 54, characterized in that said third detector detects a scramble code using a plurality of said third average correlation coefficients, each of said third average correlation coefficients having identical said frame boundaries and scramble code group detected by said second detector.

58. The cell search apparatus for a mobile station in a mobile communication system according to claim 54, characterized in that said first detector comprises means for calculating a fourth average correlation coefficient by averaging a plurality of said first average correlation coefficients within a predetermined slots, and means for detecting said slot boundaries using a timing with which the fourth average correlation coefficient is largest.

59. The cell search apparatus for a mobile station in a mobile communication system according to claim 54, characterized in that said second detector comprises means for calculating a fifth average correlation coefficient by averaging, within a predetermined slots, a plurality of said second average correlation coefficients, each of said second average correlation coefficients having identical said slot boundaries detected by said first detector, and means for detecting said frame boundaries and scramble code group using a timing with which the fifth average correlation coefficient is largest.

60. The cell search apparatus for a mobile station in a mobile communication system according to claim 55, characterized in that said first detector comprises means for calculating a fourth average correlation coefficient by averaging a plurality of said first average correlation coefficients within a predetermined slots, and means for detecting said slot boundaries using a timing with which the fourth average correlation coefficient is largest.

61. The cell search apparatus for a mobile station in a mobile communication system according to claim 55, characterized in that said third detector comprises means for calculating a seventh average correlation coefficient by averaging, within a predetermined slots, a plurality of said third average correlation coefficients, each of said third average correlation coefficients having identical said frame boundaries and scramble code group detected by said second detector, and means for detecting said scramble codes using the seventh average correlation coefficient.

62. The cell search apparatus for a mobile station in a mobile communication system according to claim 57, characterized in that said first detector comprises means for calculating a fourth average correlation coefficient by averaging a plurality of said first average correlation coefficients within a predetermined slots, and means for detecting said slot boundaries using a timing with which the fourth average correlation coefficient is largest.

63. The cell search apparatus for a mobile station in a mobile communication system according to claim 57, characterized in that said second detector comprises means for calculating a fifth average correlation coefficient by averaging, within a predetermined slots, a plurality of said second average correlation coefficients, each of said second average correlation coefficients having identical said slot boundaries detected by said first detector, and means for detecting said frame boundaries and scramble code group using a timing with which the fifth average correlation coefficient is largest.

64. The cell search apparatus for a mobile station in a mobile communication system according to claim 57, characterized in that said third detector comprises means for calculating a seventh average correlation coefficient by averaging, within a predetermined slots, a plurality of said third average correlation coefficients, each of said third average correlation coefficients having identical said frame boundaries and scramble code group detected by said second detector, and means for detecting said scramble codes using the seventh average correlation coefficient.

65. The cell search apparatus for a mobile station in a mobile communication system according to claim 56, characterized in that a plurality of said first average correlation values are weighted.

66. The cell search apparatus for a mobile station in a mobile communication system according to claim 56, characterized in that said fourth average correlation value is calculated by adding a value obtained by multiplying a plurality of said first average correlation values by a forgetting factor.

67. The cell search apparatus for a mobile station in a mobile communication system according to claim 56, characterized in that said predetermined slots is adaptively changed according to a state of said mobile station.

68. The cell search apparatus for a mobile station in a mobile communication system according to claim 65, characterized in that a value of said weighting is adaptively changed according to the state of said mobile station.

69. The cell search apparatus for a mobile station in a mobile communication system according to claim 66, characterized in that a value of said forgetting factor is adaptively changed according to the state of said mobile station.

70. The cell search apparatus for a mobile station in a mobile communication system according to claim 67, characterized in that the state of said mobile station is either a state immediately after power-on or a standby state or a communicating state.

71. The cell search apparatus for a mobile station in a mobile communication system according to claim 67, characterized in that the state of said mobile station is set according to a movement speed of said mobile station in advance.

72. The cell search apparatus for a mobile station in a mobile communication system according to claim 68, characterized in that the state of said mobile station is either a state immediately after power-on or a standby state or a communicating state.

73. The cell search apparatus for a mobile station in a mobile communication system according to claim 68, characterized in that the state of said mobile station is set according to a movement speed of said mobile station in advance.

74. The cell search apparatus for a mobile station in a mobile communication system according to claim 69, characterized in that the state of said mobile station is either a state immediately after power-on or a standby state or a communicating state.

75. The cell search apparatus for a mobile station in a mobile communication system according to claim 69, characterized in that the state of said mobile station is set according to a movement speed of said mobile station in advance.

76. A cell search apparatus for a mobile station in a mobile communication system, the apparatus being characterized by comprising:
a first detector for despreading a received signal by the mobile station using a common spreading code common to all slots and detecting slot boundaries on the basis of a first average correlation coefficient;
a second detector for despreading the signal on the basis of said slot boundaries detected by the first detector, using different individual spreading codes for said respective slots and detecting frame boundaries and a scramble code group on the basis of a second average correlation coefficient; and
a third detector for descrambling a common pilot signal on the basis of said frame boundaries and scramble code group detected by the second detector, and detecting a scramble code on the basis of a third average correlation coefficient;
wherein said second detector comprises means for storing a plurality of said second average correlation coefficients, each of said second average correlation coefficients having identical said slot boundaries detected by said first detector, and means for detecting frame boundaries and a scramble code group using a plurality of said second average correlation coefficients.

77. The cell search apparatus for a mobile station in a mobile communication system according to claim 76, characterized in that said third detector comprises detecting a scramble code using a plurality of said third average correlation coefficients, each of said third average correlation coefficients having identical said frame boundaries and scramble code group detected by said second detector.

78. The cell search apparatus for a mobile station in a mobile communication system according to claim 76, characterized in that said second detector comprises means for calculating a fifth average correlation coefficient by averaging, within a predetermined slots, a plurality of said second average correlation coefficients, each of said second average correlation coefficients having identical said slot boundaries detected by said first detector, and means for detecting said frame boundaries and scramble code group using a timing with which the fifth average correlation coefficient is largest.

79. The cell search apparatus for a mobile station in a mobile communication system according to claim 77, characterized in that said second detector comprises means for calculating a fifth average correlation coefficient by averaging, within a predetermined slots, a plurality of said second average correlation coefficients, each of said second average correlation coefficients having identical said slot boundaries detected by said first detector, and means for detecting said frame boundaries and scramble code group using a timing with which the fifth average correlation coefficient is largest.

80. The cell search apparatus for a mobile station in a mobile communication system according to claim 77, characterized in that said third detector comprises means for calculating a seventh average correlation coefficient by averaging, within a predetermined slots, a plurality of said third average correlation coefficients, each of said third average correlation coefficients having identical said frame boundaries and scramble code group detected by said second detector, and means for detecting said scramble codes using the seventh average correlation coefficient.

81. The cell search apparatus for a mobile station in a mobile communication system according to claim 78, characterized in that a plurality of said second average correlation values are weighted.

82. The cell search apparatus for a mobile station in a mobile communication system according to claim 78, characterized in that if said slot boundaries detected by said first detector are equal, a value is added which is obtained by multiplying a sixth average correlation coefficient obtained by averaging a plurality of said second average correlation coefficients within a predetermined slots, by a forgetting factor, and if said slot boundaries detected by said first detector are different, a result of the addition of said second average correlation coefficients is defined as said fifth average correlation coefficient.

83. The cell search apparatus for a mobile station in a mobile communication system according to claim 78, characterized in that said predetermined slots is adaptively changed according to a state of said mobile station.

84. The cell search apparatus for a mobile station in a mobile communication system according to claim 81, characterized in that a value of said weighting is adaptively changed according to the state of said mobile station.

85. The cell search apparatus for a mobile station in a mobile communication system according to claim 82, characterized in that a value of said forgetting factor is adaptively changed according to the state of said mobile station.

86. The cell search apparatus for a mobile station in a mobile communication system according to claim 83, characterized in that the state of said mobile station is either a state immediately after power-on or a standby state or a communicating state.

87. The cell search apparatus for a mobile station in a mobile communication system according to claim 83, characterized in that the state of said mobile station is set according to a movement speed of said mobile station in advance.

88. The cell search apparatus for a mobile station in a mobile communication system according to claim 84, characterized in that the state of said mobile station is either a state immediately after power-on or a standby state or a communicating state.

89. The cell search apparatus for a mobile station in a mobile communication system according to claim 84, characterized in that the state of said mobile station is set according to a movement speed of said mobile station in advance.

90. The cell search apparatus for a mobile station in a mobile communication system according to claim 85, characterized in that the state of said mobile station is either a state immediately after power-on or a standby state or a communicating state.

91. The cell search apparatus for a mobile station in a mobile communication system according to claim 85, characterized in that the state of said mobile station is set according to a movement speed of said mobile station in advance.

92. A cell search apparatus for a mobile station in a mobile communication system, the apparatus being characterized by comprising:
a first detector for despreading a received signal by the mobile station using a common spreading code common to all slots and detecting slot boundaries on the basis of a first average correlation coefficient;

a second detector for despreading the signal on the basis of said slot boundaries detected by the first detector, using different individual spreading codes for said respective slots, and detecting frame boundaries and a scramble code group on the basis of a second average correlation coefficient; and a third detector for descrambling a common pilot signal on the basis of said frame boundaries and scramble code group detected by the second detector, and detecting a scramble code on the basis of a third average correlation coefficient;

wherein said third detector comprises means for storing a plurality of said third average correlation coefficients, each of said third average correlation coefficients having identical said frame boundaries and scramble code group detected by said second detector, and means for detecting a scramble code is detected using a plurality of said third average correlation coefficients.

93. The cell search apparatus for a mobile station in a mobile communication system according to claim 92, characterized in that said third detector comprises means for calculating a seventh average correlation coefficient by averaging, within a predetermined slots, a plurality of said third average correlation coefficients, each of said third average correlation coefficients having identical said frame boundaries and scramble code group detected by said second detector, and means for detecting said scramble codes using the seventh average correlation coefficient.

94. The cell search apparatus for a mobile station in a mobile communication system according to claim 93, characterized in that a plurality of said third average correlation values are weighted.

95. The cell search apparatus for a mobile station in a mobile communication system according to claim 93, characterized in that if said frame boundaries and scramble code groups detected by said second detector are respectively equal, a value can be added which is obtained by multiplying an eighth average correlation coefficient obtained by averaging a plurality of said third average correlation coefficients within a predetermined slots, by a forgetting factor, and if said frame boundaries and scramble code groups detected by said second detector are respectively different, a result of the addition of said third average correlation coefficients is defined as said seventh average correlation coefficient.

96. The cell search apparatus for a mobile station in a mobile communication system according to claim 93, characterized in that said predetermined slots is adaptively changed according to a state of said mobile station.

97. The cell search apparatus for a mobile station in a mobile communication system according to claim 94, characterized in that a value of said weighting is adaptively changed according to the state of said mobile station.

98. The cell search apparatus for a mobile station in a mobile communication system according to claim 95, characterized in that a value of said forgetting factor is adaptively changed according to the state of said mobile station.

99. The cell search apparatus for a mobile station in a mobile communication system according to claim 96, characterized in that the state of said mobile station is either a state immediately after power-on or a standby state or a communicating state.

100. The cell search apparatus for a mobile station in a mobile communication system according to claim 96, characterized in that the state of said mobile station is set according to a movement speed of said mobile station in advance.

101. The cell search apparatus for a mobile station in a mobile communication system according to claim 97, characterized in that the state of said mobile station is either a state immediately after power-on or a standby state or a communicating state.

102. The cell search apparatus for a mobile station in a mobile communication system according to claim 97, characterized in that the state of said mobile station is set according to a movement speed of said mobile station in advance.

103. The cell search apparatus for a mobile station in a mobile communication system according to claim 98, characterized in that the state of said mobile station is either a state immediately after power-on or a standby state or a communicating state.

104. The cell search apparatus for a mobile station in a mobile communication system according to claim 98, characterized in that the state of said mobile station is set according to a movement speed of said mobile station in advance.

* * * * *

UNITED STATES PATENT AND TRADEMARK OFFICE
CERTIFICATE OF CORRECTION

PATENT NO. : 7,012,909 B2
APPLICATION NO. : 09/944450
DATED : March 14, 2006
INVENTOR(S) : Motohiro Tanno and Takehiro Nakamura It is certified that error appears in the above-identified patent and that said Letters Patent is hereby corrected as shown below:

Column 1
Line 40, before "transmitted" change "is" to --are--
Line 49, before "transmitted" change "is" to --are--
Line 58, before "multi-slot" change "an" to --a--

Column 2
Line 18, before "executed" change "is" to --are--

Column 7
Line 16, change "203" to --503--

Column 8
Line 58, before "executed" change "is" to --are--
Line 59, before "calculated" change "are" to --is--

Column 9
Line 8, change "results" to --are the results that--
Line 29, change "403" to --1103--

Column 10
Line 6, after "scamble" insert --code groups--
Line 29, change "results" to --are the results that--

Column 11
Line 15, change "(n>2)" to --(n$\geq$2)--

Column 13
Line 48, change "(n>2)" to --(n$\geq$2)--
Line 49, before "frame boundaries" remove "a"

UNITED STATES PATENT AND TRADEMARK OFFICE
CERTIFICATE OF CORRECTION

PATENT NO. : 7,012,909 B2
APPLICATION NO. : 09/944450
DATED : March 14, 2006
INVENTOR(S) : Motohiro Tanno and Takehiro Nakamura It is certified that error appears in the above-identified patent and that said Letters Patent is hereby corrected as shown below:

<u>Column 15</u>
Line 33, change "(n>2)" to --(n$\geq$2)--

Signed and Sealed this

Seventeenth Day of October, 2006

JON W. DUDAS
*Director of the United States Patent and Trademark Office*